United States Patent
Tahiliani

[11] 3,819,845
[45] June 25, 1974

[54] TERMINATION FOR METAL ENCLOSED, COMPRESSED GAS INSULATED ELECTRICAL CONDUCTOR

[75] Inventor: Vasu H. Tahiliani, New Stanton, Pa.
[73] Assignee: I-T-E Imperial Corporation, Spring House, Pa.
[22] Filed: Feb. 23, 1973
[21] Appl. No.: 335,326

[52] U.S. Cl............. 174/11 R, 174/12 R, 174/18, 174/23 R, 174/28
[51] Int. Cl............................................ H02g 15/22
[58] Field of Search............ 174/11 R, 11 BH, 12 R, 174/12 BH, 14 BH, 15 BH, 16 BH, 18–20, 22 C, 23 R, 28, 31 R, 142

[56] References Cited
UNITED STATES PATENTS

| | | | |
|---|---|---|---|
| 3,520,989 | 7/1970 | Funk et al. | 174/18 X |
| 3,573,341 | 4/1971 | Graybill et al. | 174/28 X |
| 3,643,003 | 2/1972 | Graybill | 174/18 |

FOREIGN PATENTS OR APPLICATIONS

| | | | |
|---|---|---|---|
| 476,379 | 9/1969 | Switzerland | 174/28 |

Primary Examiner—Laramie E. Askin
Attorney, Agent, or Firm—Ostrolenk, Faber, Gerb & Soffen

[57] ABSTRACT

A high voltage conductor is enclosed in a grounded metal enclosure. The conductor is insulated from the enclosure by a compressed insulating gas. The conductor extends through while its enclosure terminates at a termination apparatus at the wall of the oil filled tank of an electrical component, like a transformer. The termination apparatus comprises a pair of spaced, enclosure sealing, barrier insulators, which are positioned in the enclosure and define a compartment between them. Behind one insulator is the oil of the transformer tank and behind the other insulator is sealed the insulating gas. The intermediate compartment is filled with transformer oil. Leakage of insulating gas past its sealing insulator is trapped in the intermediate compartment and the gas is thereby kept out of the transformer tank.

26 Claims, 2 Drawing Figures

TERMINATION FOR METAL ENCLOSED, COMPRESSED GAS INSULATED ELECTRICAL CONDUCTOR

BACKGROUND OF THE INVENTION

The present invention relates to high voltage compressed gas insulated conductors and particularly to termination apparatus for connecting such conductors to electrical apparatus components.

In connection with high voltage installations, such as electrical substations and generating stations, or for transmission of electrical power over any distances, and in apparatus used in such installations, e.g., transformers, the conductors or buses and other principal components are housed in grounded conductive metallic enclosures and the energized parts are insulated from the enclosures by a compressed insulating gas, such as sulfur hexafluoride ($SF_6$). These metal enclosed high voltage electrical conductors may be buried underground or may be supported at some convenient height above ground.

A compressed gas insulated conductor is comprised of a metallic, generally tubular, conductor, which is concentrically supported within a grounded metallic tube enclosure of larger diameter by means of a solid disc or cone shaped insulator. The metallic conductor is insulated from the enclosure by a compressed gas, such as sulfur hexafluoride ($SF_6$), having a high dielectric characteristic.

The principal advantage of a compressed gas insulated bus, as compared with a conventional open bus, is the great reduction in the space required for multiphase bus systems. In addition, the compressed gas insulated bus has a grounded metal enclosure for each phase, and thereby offers greater reliability and safety.

In substations and other installations, connections between conductors and various components of the substation, such as electric power transformers, have been of many different types, as described in the discussion of the prior art in U.S. Pat. No. 3,643,003 issued Feb. 15, 1972 to Howard W. Graybill, entitled "Transformer Termination for Metal-Enclosed, Compressed-Gas-Insulated Electrical Conductors", and assigned to the assignee hereof. This patent discloses and claims a termination apparatus suitable for mounting a gas insulated electrical conductor to the wall of an electrical component, such as a transformer.

Particular problems arise when the electrical component to which the conductor is connected is emplaced in a tank containing a fluid, usually oil, which is different from the compressed insulating gas used in the conductor, and which tank fluid should not be contaminated with the insulating gas. A transformer may be damaged if bubbles of the insulating gas leak into and become trapped in its windings, for example.

The connection between the gas filled conductor and the component tank as disclosed in the aforesaid patent uses an effective, but somewhat complex, termination which is relatively great in length, includes a cylindrical oil or other fluid filled pocket extending into the protective enclosure around the conductor and is not secured against leakage of the insulating gas into the component tank.

SUMMARY OF THE INVENTION

In the termination in accordance with the present invention, the enclosure for the conductor terminates just inside the wall of the tank of the electrical component. It is not necessary to build out an extension from that wall to receive the conductor enclosure. A pair of spaced apart barriers or barrier type electrical insulators are positioned in the enclosure near its end, are sealed around the exterior of the conductor and around the interior of the enclosure and form a compartment between themselves. The barriers are shaped to seal the compartment. The oil or other fluid in the component tank both contacts the tank facing side of the tank facing insulator and fills the compartment between the insulators at substantially the same pressure. The outwardly or conductor facing insulator seals the insulating gas in the conductor enclosure and attempts to prevent any of that gas from passing into the intermediate compartment. Any insulating gas that leaks past the conductor facing insulator is trapped in the compartment. If the gas is lighter than the fluid, as is the case when the fluid is oil, the gas rises to the top of the compartment where it can be measured, where it is trapped and prevented from passing into the fluid filled tank of the electrical component and from which it can be periodically extracted.

In accordance with a first embodiment of the invention, an expansion chamber communicates with the top of the intermediate compartment. Any gas that leaks past the conductor facing insulator and into the compartment rises into the expansion chamber. Because the intermediate compartment is sealed by both insulators, because the expansion chamber is closed, because the oil in the compartment may also extend into the lower section of the expansion chamber and because the oil is incompressible, the volume of oil in the compartment and expansion chamber does not vary, but the gas pressure in the expansion chamber increases as more insulating gas rises into this chamber. A pressure gauge communicating with the expansion chamber indicates how much gas has leaked and indicates the pressure in the expansion chamber and in the intermediate compartment. If there is too great a pressure differential between the the compartment and the tank across the tank facing insulator and if this insulator, after many years of service, fails to function as a perfect barrier, there is a possibility of oil leaking past this insulator from the compartment into the tank. Enlarging the expansion chamber and/or periodically relieving the gas pressure in it will reduce or eliminate the undesirable pressure differential.

In accordance with a second embodiment of the invention, there is a pressure balancing connection or pipe extending between the component tank and the bottom of the intermediate compartment. Any gas leaking across the conductor facing insulator into the intermediate compartment displaces some of the oil in the compartment through the pressure balancing connection, whereby as more gas leaks into the compartment, the volume occupied by the gas increases but there is no undesirable pressure differential across the tank facing insulator. In this embodiment, because the volume of gas in the compartment changes, the gas volume can be ascertained by connecting to the top of the compartment a conventional gas volume measuring means or sight gauge which senses the gas level. Escaped gas can be periodically recovered from the compartment.

The termination in accordance with either embodiment of the invention has a number of advantages. There is little possibility of the insulating gas leaking into the fluid filled tank of the electrical component or of its getting trapped in elements of the component, such as transformer windings. This is true even if there is a small leakage across the tank facing insulator because in the first described embodiment of the termination, any gas that enters the compartment becomes trapped in the expansion chamber and is not able to reach or get past the tank facing insulator, and in the second described embodiment, the pressure differential across the tank facing insulator is essentially zero. Any insulating gas which leaks past the conductor facing insulator is trapped in the intermediate compartment and can be reclaimed.

The termination is much shorter in length than prior art terminations. There is elimination of the cylindrical pocket projecting out of the wall of the tank of the component.

Conventional bushing porcelain is unnecessary, and this results in considerable savings in view of the cumbersome procedures of assembly. Finally, there is elimination of the need for explosion bonded bimetallic aluminum copper rings to obtain a hermetic seal as is conventionally used.

Accordingly, it is the primary object of the present invention to provide a novel termination for a metal enclosed compressed gas insulated conductor on the wall of the tank of an electrical component to which the conductor is connected.

It is a further object of the invention to make such a termination compact, economical and effective.

It is another object of the invention to reduce the possibility that insulating gas from the conductor enclosure in such a termination will enter the fluid filled electrical component tank.

These and other objects of the present invention will become apparent from the following description of the accompanying drawings, in which:

FIG. 1 is a schematic cross-sectional view through one embodiment of a termination in accordance with the present invention; and FIG. 2 is a schematic cross-sectional view through another embodiment of a termination in accordance with the present invention.

DETAILED DESCRIPTION OF THE INVENTION

Figure 1:
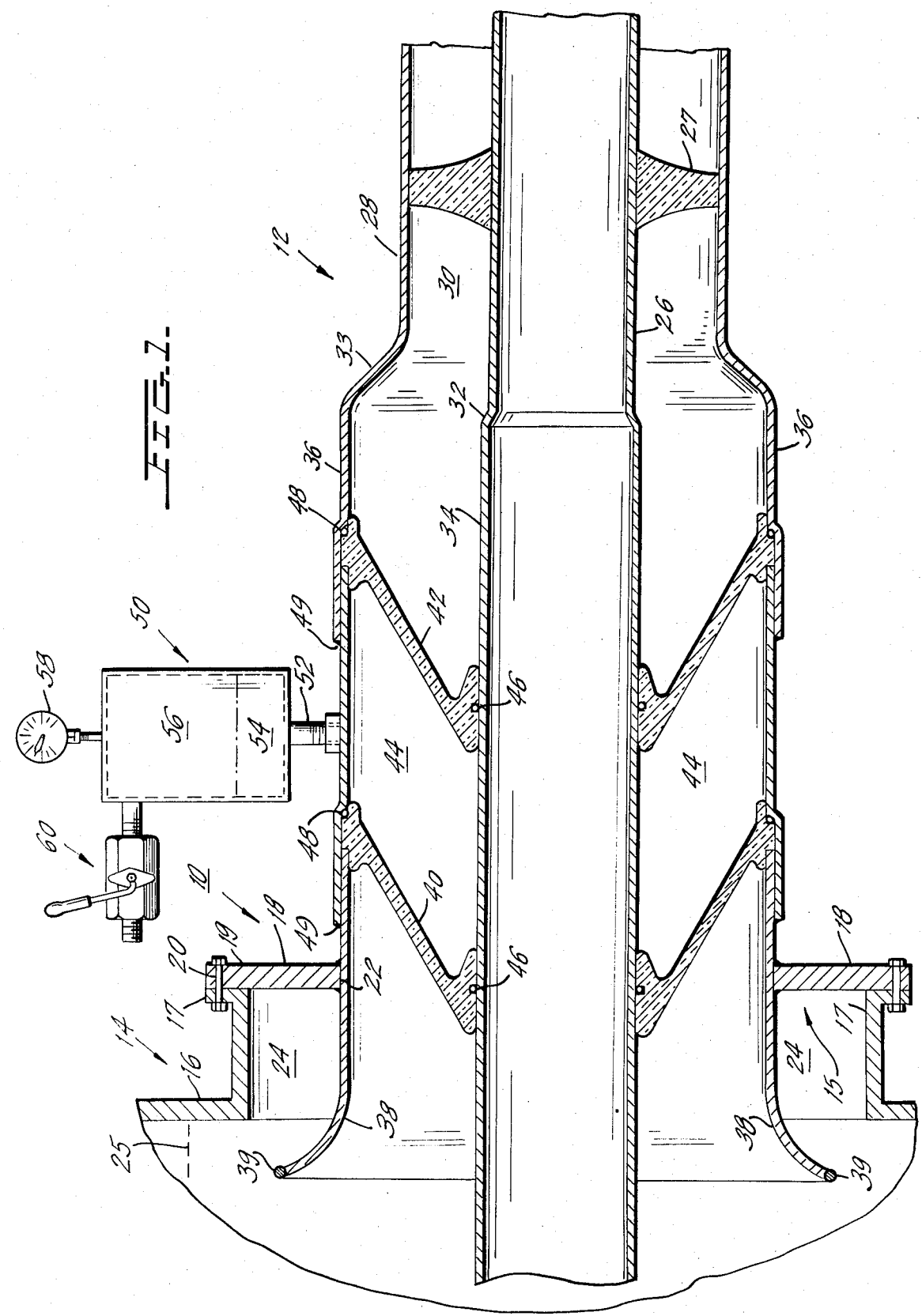

Referring to FIG. 1, termination 10 is used for joining high voltage conductor and enclosure assembly 12 to tank 14 of an electrical component (not shown). The electrical component may be a conventional substation or generating station component, such as a transformer, or the like.

Tank 14 includes an annular opening 15 through its wall 16. The periphery of opening 15 is rigidified by annular upturned flange 17 which surrounds the opening and is closely spaced to tank wall 16. Annular conductor enclosure support plate 18 has its exterior portion 19 sealingly bolted at 20 to upstanding flange 17. Plate 18 has an opening 22 therethrough dimensioned to seal against the exterior of enclosure section 36, and these engaging surfaces, being of the same material, are seal welded, thereby preventing leakage of the oil within space 24 past plate 18.

Tank 14 has space 24 within it, which is filled up to level 25 above the upper surface of below described enclosure 28, 36, with a fluid, oil.

Conductor assembly 12 includes a conventional, elongated, metallic aluminum, hollow tube, high voltage electric conductor 26, which is concentrically supported by a plurality of spaced conventional supporting insulators 27 inside conventional, correspondingly elongated, hollow tube metallic protective enclosure 28. Enclosure 28 is conventionally comprised of a rigid, hollow shell of conductive metal, which serves both as a ground shield for high voltage conductor 26 and as a pressure vessel for the gas in space 30. There are alternative constructions for enclosure 28, such as that taught in U.S. Pat. application Ser. No. 318,693, filed Dec. 26, 1972, by John C. Cronin, Elijah R. Perry and Howard W. Graybill, entitled "Enclosure for Conductor of Electrical Transmission System", and assigned to the assignee hereof.

Space 30 between conductor 26 and enclosure 28 is filled with the compressed insulating gas sulfur hexafluoride.

At 32, conductor 26 enlarges in diameter and at 33, enclosure 28 enlarges in diameter before the start of termination 10 in accordance with the invention. The gas in space 30 has a greater dielectric strength than the oil in tank 14 and the greater diameter of enclosure section 36 and conductor section 34 within termination 10 compensates for this lower dielectric strength. Both the widened section 34 of conductor 26 and the widened section 36 of enclosure 28 extend into tank 14. Conductor 26, 34 is connected with the electrical component in the tank. Enclosure section 36 extends through and past opening 22 in termination mounting plate 18, flares outwardly at 38 when it enters tank 14 to eliminate high voltage gradients and terminates in an outwardly curving lip having a conventional corona ring 39 at its terminal edge.

Extending between enclosure section 36 and conductor section 34 and positioned as close as practicable to tank 14 while being supported outside tank 14 by enclosure section 36 are a pair of conical barriers or barrier type disc insulators, including tank facing insulator 40 and conductor facing insulator 42. The insulators are spaced apart sufficiently to define protective compartment 44, to be described further below. Both of conical insulators 40, 42 are shown as tapering narrower facing inward toward tank 14. However, there is no obvious advantage to orienting insulators 40, 42 to face in a particular direction. Both of insulators 40, 42 are sealed at their inner ends against conductor section 34 by O-rings 46 and are sealed at their outer ends against enclosure section 36 by O-rings 48 and circumferential seal welds 49.

It is the purpose of conductor facing insulator 42 to seal the compressed gas in space 30 and to prevent the gas from passing into compartment 44. Any gas that leaks past insulator 42 is prevented from entering tank 14 by insulator 40.

Compartment 44 is also filled with the oil that fills space 24 and preferably holds this oil at the same pressure as in space 24. Tank facing insulator 40 separates the oil in space 24 from that in compartment 44. At most, there is minimal leakage across insulator 40. Oil in compartment 44 will never leak past insulator 42 and into dielectric space 30, due to a higher pressure in compartment 30 as compared to compartment 44.

An enclosed expansion chamber 50 is connected through pipe 52 to the top of compartment 44. The oil level in compartment 44 is such that there is a pool 54 of oil in the lower section of expansion chamber 50. Gas that has leaked from space 30 into compartment 44 rises to the top of the compartment and passes through the outlet pipe 52 into expansion chamber 50 forming a pocket 56 of gas. Because compartment 44 and expansion chamber 50 are sealed and because the oil in compartment 44 and chamber section 54 is incompressible, the volume of the gas in pocket 56 does not change, but its pressure increases as more gas enters the pocket. Pressure gauge 58 communicating with pocket 56 measures the pressure in chamber 50 and in compartment 44. Eventually, through continuing slow gas leakage, the pressure in compartment 44 will build up such that there will be an undesirable pressure differential across the insulators 40 and 42 which could undesirably promote leakage of oil from compartment 44. Enlarging expansion chamber 50 will alleviate this problem. In addition, or alternatively, a manually operable relief valve unit 60 communicates with gas pocket 56 in chamber 50. Periodically opening valve 60 will relieve the pressure in pocket 56 and permit either disposal or recovery of the gas under pressure in the pocket. Hence, relief valve 60 serves as a means for gathering the gas that has entered compartment 44.

With simplified termination 10, having a pair of spaced apart insulators 40, 42 in enclosure 28, 36 adjacent wall 16 of tank 14 of the electric component, with insulator 40 facing toward tank 14, other insulator 42 facing toward conductor 26 and the intermediate resulting compartment 44 being filled with fluid from tank 14, an effective termination for connecting a high voltage conductor to the tank of an electric component, such as a transformer, is obtained.

Figure 2:
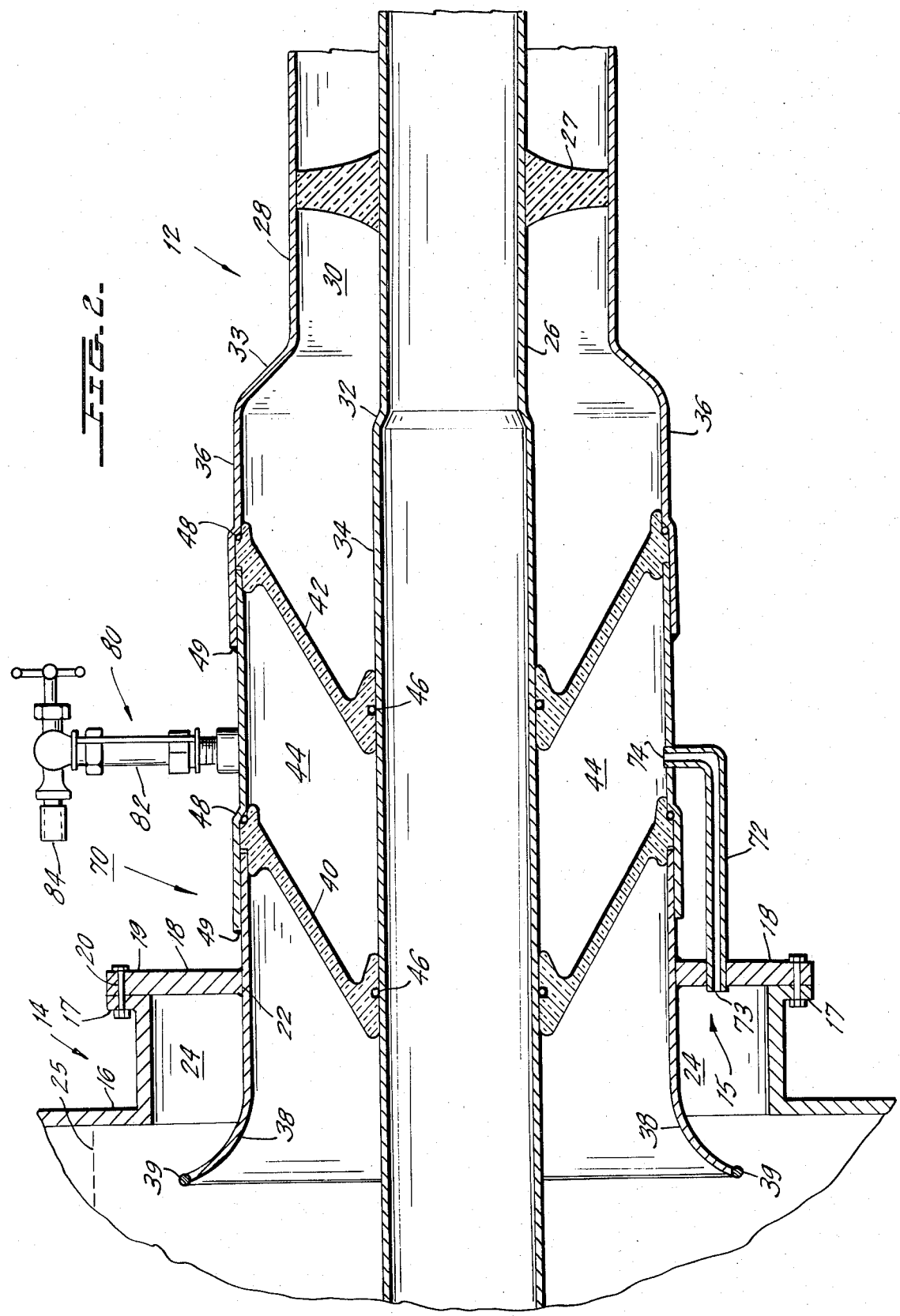

The second embodiment of termination 70 shown in FIG. 2 operates substantially identically to the first embodiment of termination 10 shown in FIG. 1, except that there is a means for continuously relieving the pressure build up in compartment 44 due to leakage of gas from space 30 across insulator 42 into compartment 44. The features of terminations 10 and 70 which are the same are identically numbered in both drawings. Only those features which are present in termination 70, but are either not in or are different from those in termination 10 are now discussed.

In termination 10, space 24 and compartment 44 are sealed from each other. In termination 70, space 24 communicates through a pressure balancing means, i.e., open connecting pipe 72, with compartment 44. The advantage of providing a connecting pipe 72 is that there is no pressure differential across insulator 40 since the pressure between space 24 and compartment 44 will be equalized. As a result, a standard design can be applied to different size components and transformers and tanks having a variety of oil heads 25 above the level of termination 10.

Pipe 72 and its connections 73 to space 24 and 74 to compartment 44 are positioned so as to be normally at the bottom of enclosure section 36 when termination 70 is installed. Any gas that leaks past insulator 72 into compartment 44 rises through the compartment and does not pass into pipe 72 into space 24. For the same reason, connection 74 from pipe 72 is located nearer to insulator 40 than to insulator 42 so that none of the gas will reach to pipe 72 but will instead float up.

A valve 80 is positioned at what is the top of compartment 44 when termination 70 is mounted in tank 14. A sight gauge 82 monitors the presence of oil and the level of oil indicates the volume of gas which has leaked past insulator 42 into compartment 44 and has risen into gauge 82. When sight gauge 82 indicates that it is necessary and or whenever it is desired to remove the leaked gas, possibly for reuse, valve 80 is opened and the gas exits in a closely regulated manner through outlet 84, whereby valve 80 also serves as a means for gathering the gas that enters compartment 44.

Although the present invention has been described in connection with its preferred embodiments, many variations and modifications will now be apparent to those skilled in the art. It is preferred, therefore, that the present invention be limited not by the specific disclosure herein, but only by the appended claims.

I claim:

1. A termination for a metal enclosed compressed gas insulated electrical conductor assembly, wherein said conductor assembly comprises:

an elongated metallic conductor which is adapted to extend into a tank containing an electrical component; an enclosure around and spaced from said conductor; said enclosure having an open end and an opening into said open end with said enclosure open end also being adapted to extend into the tank; support means in said enclosure supporting said conductor therein;

a pair of barriers positioned in said enclosure, spaced apart from each other to define a compartment therebetween, each extending between said enclosure and said conductor, and each sealing the space between said enclosure and said conductor; one said barrier being nearer said enclosure opening and being the tank facing barrier and the other said barrier being further from said enclosure opening and being the conductor facing barrier;

whereby any gas in said enclosure on the side of said conductor facing barrier away from said enclosure opening is precluded from moving past said conductor facing barrier, and if it does move past that barrier, said tank facing barrier prevents further bypassage of the gas and traps the gas in said compartment.

2. The termination of claim 1, further comprising means for gathering any gas that escapes into said compartment past said conductor facing barrier; said compartment having side ends defined by said barriers and having a top and an opposite bottom joining said barriers; said termination being oriented so that its said top is upward; said gathering means being located at said top of said compartment.

3. The termination of claim 2, wherein said gathering means comprises a measuring gauge and a valve which permits regulated exit of said gas from said compartment.

4. The termination of claim 3, wherein said gathering means comprises an expansion chamber communicating with said top of said compartment; said measuring gauge comprising a pressure gauge communicating with said expansion chamber; said expansion chamber having an upper section to which gas would rise; said valve communicating with said expansion chamber upper section.

5. The termination of claim 1, wherein said barriers are comprised of electric insulators.

6. The termination of claim 5, wherein said insulators are conically shaped with the narrowed end of each cone facing toward said enclosure opening.

7. The termination of claim 1, wherein said conductor and said enclosure are wider between said enclosure opening and a location past both said barriers, than the remainder of said conductor assembly beyond said barriers.

8. The termination of claim 7, wherein near said enclosure opening, said enclosure sharply flares wider.

9. The termination of claim 8, further comprising a corona ring at the edge of said enclosure opening.

10. In combination, the termination of claim 1 and a tank having an interior for receiving an electrical component; said tank having a side wall with an opening therethrough through which extend said conductor and said enclosure; means sealing said opening closed around said enclosure; said enclosure opening facing inward to said tank interior, the said space in said enclosure between said conductor and said enclosure and up to said tank facing barrier in said enclosure communicates with said tank interior.

11. The combination of claim 10, wherein said enclosure sealing means on said tank wall comprises an annular flange protruding a short distance away from said tank wall and an annular sealing plate carried on said flange and sealingly fitted around said enclosure.

12. The combination of claim 10, wherein said barriers are comprised of electric insulators.

13. The combination of claim 12, wherein said insulators are conically shaped with the narrowed end of each cone facing toward said enclosure opening.

14. The combination of claim 10, wherein said tank interior and said enclosure up to said tank facing barrier are filled with oil above the level of said enclosure; said compartment is also filled with oil; said space in said enclosure is filled with a dielectric gas up to said conductor facing barrier and said gas being absent from said compartment and said tank.

15. The combination of claim 14, wherein said compartment has a top side; gathering means comprising an expansion chamber for gathering any gas that escapes into said compartment past said conductor facing barrier communicates with said top side of said compartment; said gathering means further comprises a pressure gauge communicating with said expansion chamber; said expansion chamber having an upper section to which gas would rise; a valve which permits regulated exit of said gas from said compartment communicates with said expansion chamber upper section.

16. The combination of claim 14, further comprising a pressure balancing connection between said tank interior and said compartment.

17. The combination of claim 16, further comprising means for gathering any gas that escapes into said compartment past said conductor facing barrier; said gathering means being located at the top of said compartment.

18. The combination of claim 17, wherein said barriers are comprised of electric insulators.

19. The combination of claim 16, wherein said pressure balancing connection comprises a pipe which is connected with said tank at a location below said enclosure and is connected with the lower side of said compartment.

20. The combination of claim 10, wherein said compartment has a top side; gathering means comprising an expansion chamber for gathering any gas that escapes into said compartment past said conductor facing barrier communicates with said top side of said compartment; said gathering means further comprises a pressure gauge communicating with said expansion chamber; said expansion chamber having an upper section to which gas would rise; a valve which permits regulated exit of said gas from said compartment communicates with said expansion chamber upper section.

21. The combination of claim 10, further comprising a pressure balancing connection between said tank interior and said compartment.

22. The combination of claim 21, further comprising means for gathering any gas that escapes into said compartment past said conductor facing barrier; said gathering means being located at the top of said compartment.

23. The combination of claim 22, wherein said gathering means comprises a measuring gauge and a valve which permits regulated exit of said gas from said compartment.

24. The combination of claim 21, wherein said conductor and said enclosure are wider between said enclosure opening and a location past both said barriers, than the remainder of said conductor assembly beyond said barriers.

25. The combination of claim 24, wherein near said enclosure opening, said enclosure sharply flares wider.

26. The combination of claim 25, further comprising a corona ring at the edge of said opening into said enclosure.

* * * * *